United States Patent [19]

Sato

[11] Patent Number: 4,619,962
[45] Date of Patent: * Oct. 28, 1986

[54] THERMOPLASTIC POLYMER COMPOSITIONS

[75] Inventor: Kyosaku Sato, Sarnia, Canada

[73] Assignee: Polysar Limited, Sarnia, Canada

[*] Notice: The portion of the term of this patent subsequent to Apr. 2, 2002 has been disclaimed.

[21] Appl. No.: 722,358

[22] Filed: Apr. 12, 1985

Related U.S. Application Data

[63] Continuation-in-part of Ser. No. 549,501, Nov. 7, 1983, abandoned.

[51] Int. Cl.$^4$ .................. C08K 3/22; C08K 3/16; C08L 13/00; C08L 77/06
[52] U.S. Cl. .................. 524/401; 524/432; 524/433; 524/434; 524/436; 524/514; 525/183
[58] Field of Search ............... 524/401, 514, 432, 433, 524/434, 436; 525/183

[56] References Cited

U.S. PATENT DOCUMENTS

| | | | |
|---|---|---|---|
| 3,236,914 | 2/1966 | Murdock | 525/167 |
| 3,591,565 | 6/1971 | Hansen | 524/401 |
| 3,738,949 | 6/1973 | Schonberg | 524/401 |
| 4,174,358 | 11/1979 | Epstein | 525/425 |
| 4,197,379 | 4/1980 | Coran et al. | 525/184 |
| 4,310,638 | 1/1982 | Coran | 525/183 |
| 4,314,929 | 2/1982 | Mahoney | 524/414 |
| 4,346,194 | 8/1982 | Roura | 525/183 |
| 4,383,083 | 5/1983 | Nielinger et al. | 525/183 |
| 4,397,979 | 8/1983 | Reimschuessel | 524/401 |
| 4,404,325 | 9/1983 | Mason | 525/183 |
| 4,436,872 | 3/1984 | Flood | 525/183 |
| 4,438,230 | 3/1984 | Schwarz | 525/183 |
| 4,508,867 | 4/1985 | Sato | 524/432 |

OTHER PUBLICATIONS

"Effect of Metal Halides on the Glass Transition Temperature of Nylon-6", Arnon Siegmann et al, (1979).

*Primary Examiner*—C. Warren Ivy
*Attorney, Agent, or Firm*—Stevens, Davis, Miller & Mosher

[57] ABSTRACT

Thermoplastic compositions particularly suitable for fabrication of low permeability hoses are produced by mixing a crystalline polyamide and a carboxylated synthetic rubber as polymeric materials and as a first additive a member selected from halides of lithium, magnesium, calcium and zinc and as a second additive a member selected from oxides and hydroxides of magnesium, calcium, barium and zinc and the peroxides of calcium and zinc.

23 Claims, No Drawings

THERMOPLASTIC POLYMER COMPOSITIONS

This application is a continuation-in-part of Ser. No. 549,501, filed Nov. 7, 1983, now abandoned.

BACKGROUND OF THE INVENTION

This invention is directed to novel thermoplastic compositions comprising a nylon and a carboxylated synthetic rubber and to a process for making such compositions.

DESCRIPTION OF THE PRIOR ART

It is well known in the prior art that polyvinyl chloride can be mixed with butadiene-acrylonitrile polymers (nitrile polymers) and with carboxylated butadiene-acrylonitrile polymers (carboxylated nitrile polymers). It is also known from U.S. Pat. No. 4,197,379 that crystalline polyamide and a nitrile polymer may be mixed together and modified by reaction with a dimethylol phenol compound to yield an elastoplastic composition. U.S. Pat. No. 4,383,083 describes thermoplastic compositions which comprise partly aromatic polyamides and a polymer of a $C_4$-$C_6$ alkadiene and acrylonitrile. It is also known from the article in Die Makromolekulare Chemie, Rapid Communications 1980 Volume 1 pages 113 to 117 that certain metal salts influence the softening temperature of nylon 6.

SUMMARY OF THE INVENTION

The invention is directed in one embodiment to a thermoplastic composition comprising, per 100 parts by weight of polymeric materials, as one polymeric material from about 30 to about 80 parts by weight of a crystal line polyamide and as a second polymeric material from about 20 to about 70 parts by weight of a synthetic rubbery polymer which polymer comprises, for a total of 100 parts by weight, from about 25 to about 40 parts by weight of acrylonitrile or methacrylonitrile, from about 0.5 to about 10 parts by weight of one or more $\alpha,\beta$-unsaturated carboxylic acid and the balance butadiene, and as non-polymeric additives from about 0.1 to about 15 parts by weight per 100 parts by weight of polyamide of an additive selected from the halides of lithium, magnesium, calcium and zinc, and from about 1 to about 10 parts by weight per 100 parts by weight of polymeric materials of an additive selected from the oxides and hydroxides of magnesium, calcium, barium and zinc and the peroxides of calcium and zinc.

The invention is directed in a second embodiment to a process for producing a thermoplastic polymeric composition comprising mixing from about 30 to about 80 parts by weight of a crystalline polyamide and from about 0.1 to about 15 parts by weight per 100 parts by weight of the polyamide of an additive selected from the halides of lithium, magnesium, calcium and zinc, from about 20 to about 70 parts by weight of a synthetic rubbery polymer, for a total of 100 parts by weight of polyamide and synthetic polymer, said synthetic polymer comprising, for a total of 100 parts by weight, from about 25 to about 40 parts by weight of acrylonitrile or methacrylonitrile, from about 0.5 to about 10 parts by weight of one or more $\alpha,\beta$-unsaturated carboxylic acid and the balance butadiene, and an additive selected from the oxides and hydroxides of magnesium, calcium, barium and zinc and the peroxides of calcium and zinc in an amount of from about 1 to about 10 parts by weight per 100 parts by weight of polyamide and synthetic polymer, said mixing being at a temperature of from about 180° C. to the melting point of the polyamide for a time long enough to yield an essentially uniform thermoplastic polymeric composition.

DETAILED DESCRIPTION OF THE INVENTION

The crystalline polyamide, also known as nylon, used in this invention is a high molecular weight solid polymer having recurring amide groups within the polymer. Such polyamides are well known and may be prepared by polymerization of one or more epsilon-lactams or amino acids or by condensation or one or more dibasic acids and one or more diamines. Examples of such polyamides include nylon 6 (polycaprolactam), nylon 12 (polylauryllactam), nylon 6,6 (polyhexamethyleneadipamide), nylon 6,10 (polyhexamethylenesebacamide), nylon 11 (condensation product of 11-amino-undecanoic acid), and mixtures thereof. The majority of such nylons have melting points between about 160° and 230° C.

The synthetic rubbery polymer used in this invention is a high molecular weight solid polymer having recurring carboxylic groups along the polymer chain. Such synthetic polymers are well known and may be prepared by the well known emulsion free radical polymerization process and comprise from about 25 to about 40 parts by weight of acrylonitrile or methacrylonitrile, from about 0.5 to about 10 parts by weight of one or more $\alpha,\beta$-unsaturated carboxylic acid and the balance butadiene, for a total of 100 parts by weight. Suitable such $\alpha,\beta$-unsaturated carboxylic acids include acrylic, methacrylic, fumaric, maleic and itaconic acids. Preferably the polymer contains from about 25 to about 40 parts by weight of acrylonitrile. The molecular weight of the polymer is generally described by the Mooney viscosity (ML 1+4 at 100° C.) of from about 40 to about 80.

One additive incorporated into the compositions of this invention is selected from the halides of lithium, magnesium, calcium and zinc and is present in the composition at a level of from about 0.1 to about 15 parts by weight per 100 parts by weight of the polyamide. While it is not clear what the role of this additive is, it is believed that it may influence the melting point of the polyamide and/or it may influence the compatibility of the polyamide and the synthetic polymer. When this additive is present in the polyamide in the range of from about 0.1 to about 1 or 2 parts by weight, it is believed that the additive has little effect on the melting point of the polyamide. Suitable halides of the metals listed include the bromides, chlorides and iodides. On a cost basis, the chlorides and bromides are preferred and of these the chlorides are most preferred. Lithium chloride is a most preferred additive. The amount of this additive is preferably from about 1 to about 12 parts by weight per 100 parts by weight of polyamide and most preferably from about 2 to about 10 parts by weight per 100 parts by weight of the polyamide.

A second additive incorporated into the compositions of this invention is selected from the oxides and hydroxides of magnesium, calcium, barium and zinc and the peroxides of calcium and zinc at a level of from about 1 to about 10 parts by weight per 100 parts by weight of polyamide and synthetic polymer. It is believed that this additive reacts with the acid groups present leading to the formation of ionic bonds which act like crosslinks in the composition and provide at least part of the desired strength and thermoplastic properties in conjunction with the strength and thermoplastic properties contributed by the polyamide. A preferred level of this additive is from about 1 to about 8, and most preferably from about 2 to about 6, parts by weight per 100 parts by weight of polyamide plus synthetic polymer. On a cost and availability basis, zinc oxide, hydroxide and peroxide, magnesium oxide and hydroxide, and calcium oxide and hydroxide are preferred. Zinc oxide is the most preferred additive.

The compositions of this invention may also contain any one or more of fillers, processing aids, antioxidants or stabilizers and other components. Suitable fillers for use in the compositions include carbon black, silica, calcium silicate, clay and calcium carbonate and mixtures thereof in amounts from about 2 to about 20, especially 2 to 10, parts by weight per 100 parts by weight of polyamide plus synthetic polymer. Suitable processing aids include one or more of those well known in the rubber and plastics industries, such as the low molecular weight polyethylenes, acrylic-type polymers and the like, and suitable antioxidants or stabilizers are those well known in the rubber and plastics industries and especially include those materials known to be of value for high temperature stabilization including the hindered phenols, substituted phosphites, the complex cadmium-barium stabilizers, mixtures thereof and the like. Such processing aids may be used at levels of from about 0.2 to about 5 parts by weight of each such processing aid and such antioxidants or stabilizers may be used at levels of from about 0.1 to about 2 parts by weight of each such antioxidant or stabilizer, both per 100 parts by weight of polyamide plus synthetic polymer.

The compositions of the invention comprise, per 100 parts by weight of polymeric materials, as one polymeric material from about 30 to about 80 parts by weight of crystalline polyamide and as second polymeric material from about 20 to about 70 parts by weight of synthetic rubbery polymer. Preferably, the composition comprises from about 35 to about 70 parts by weight of crystalline polyamide and from about 30 to about 65 parts by weight of synthetic rubbery polymer. To produce compositions which are thermoplastic but also possess some rubbery characteristics, the compositions preferably comprise from about 35 to about 50 parts by weight of crystalline polyamide and from about 50 to about 65 parts by weight of synthetic rubbery polymer. To produce compositions which are thermoplastic and have very little rubbery characteristic, the compositions preferably comprise from about 55 to about 70 parts by weight of crystalline polyamide and from about 30 to about 45 parts by weight of synthetic rubbery polymer.

The process of producing the compositions of this invention comprises mixing the components at a temperature of from about 180° C. to the melting point of the polyamide for a time long enough to yield an essentially uniform polymeric composition. Generally, the temperature for such mixing will be from about 180° C. to about 230° C. The mixing may be undertaken in essentially one stage with all the components added at or immediately after the start of the mixing or in two or more stages with the polyamide and first additive being at least partially mixed first and the remaining components being added thereto or separately in a second mixing operation. Such mixing may be undertaken in rubber or plastics processing equipment such as internal mixers and mixing extruders. The first additive, that is the halide of lithium, magnesium, calcium or zinc, may be added to and mixed with the polyamide first, either as a separate stage of the mixing or before the synthetic polymer and second additive are provided; alternatively, the first additive and the polyamide may be partially mixed, the other components except for the synthetic polymer may be added and mixed therewith and finally the synthetic polymer may be added and mixed therewith; however, satisfactory mixing can be achieved by adding all the components at a single stage, for instance in an internal mixer. Any processing aids, fillers, antioxidants and stabilizers will also be similarly added to the composition. The so-formed thermoplastic compositions may be molded by any of the known means, usually at a temperature of about 180° to about 220° C., to produce shaped articles or sheets.

It is surprising that the polyamide and synthetic polymer can be mixed together satisfactorily to yield a thermoplastic material having a good balance of properties. The compositions of the invention, containing the two polymeric materials and the two additives, generally exhibit good strength, low set, low shrinkage on molding (especially compression molding) and low permeability of various fluids. When either or both of the two additives is omitted the balance of properties described above is not obtained. The polymeric compositions of this invention may be used for the production of various types of hose in which the low permeability of the hose is significant, for a variety of end-uses where resistance to organic fluids is necessary over a wide temperature range, for a variety of end-uses where abrasion resistance is necessary, and the like, thus making the compositions useful in belting, hose, roll covers and mechanical goods.

The following examples illustrate the scope of the invention. All parts are parts by weight unless specified otherwise and all test procedures are ASTM procedures unless otherwise specified.

EXAMPLE 1

Using an internal mixer operated at 220° C., the polymer mixtures shown in Table I were prepared and evaluated. The nylon was first added to the mixer followed about 1 minute later by the lithium chloride, followed about 3 minutes later by the antioxidant, processing acids and silica and by the carboxylated nitrile polymer, followed about 6 minutes later by the zinc oxide, the total mixing time being about 25 minutes, except for Experiment #1 in which the total mixing time was about 12 minutes and Experiment #2 in which the total mixing time was about 17 minutes. The carboxylated nitrile polymer contained about 29 weight percent of acrylonitrile, about 7 weight percent of carboxylic acid and the balance butadiene and had a Mooney viscosity (ML 1+4 at 100° C.) of about 50, sold under the name KRYNAC ® 221. The nylon was a nylon 11 sold under the name Rilsan RDP 1510. The resulting mixtures were molded in a press into sheets for testing, the molding being for 10 minutes at 200° C.

Of these thermoplastic compositions Experiments #1, 2 and 3 are controls. The absence of both of lithium chloride and zinc oxide (Experiment #1) yields a composition having low strength and low hardness. The absence of zinc oxide (Experiment #2) yields a composition having low strength and low Young's modulus. The absence of lithium chloride (Experiment #3) yields a composition having very high hardness and very high tensile set. The improved balance of properties for the compositions of Experiments #4, 5 and 6 are readily apparent.

TABLE I

|  | EXPERIMENT # | | | | | |
|---|---|---|---|---|---|---|
|  | 1 | 2 | 3 | 4 | 5 | 6 |
| Nylon 11 | 35 | 35 | 35 | 35 | 35 | 35 |
| Carboxylated nitrile polymer | 65 | 65 | 65 | 65 | 65 | 65 |
| Lithium chloride | — | 2.8 | — | 2.8 | 2.8 | 2.8 |
| Zinc oxide | — | — | 5 | 5 | 3 | 1 |
| Stabilizer-1 | 0.75 | 0.75 | 0.75 | 0.75 | 0.75 | 0.75 |
| Stabilizer-2 | 0.25 | 0.25 | 0.25 | 0.25 | 0.25 | 0.25 |
| Processing aid-1 | 0.5 | 0.5 | 0.5 | 0.5 | 0.5 | 0.5 |
| Processing aid-2 | 2 | 2 | 2 | 2 | 2 | 2 |
| Silica | 5 | 5 | 5 | 5 | 5 | 5 |
| Properties | | | | | | |
| Tensile strength MPa | 5.5 | 10.8 | 28.8 | 22.3 | 24.1 | 14.7 |
| Elongation % | 280 | 300 | 420 | 310 | 310 | 300 |
| 100% Modulus MPa | 4.4 | 5.9 | 12.3 | 10.8 | 9.8 | 7.7 |
| 300% Modulus MPa | — | — | 20.3 | —22.8 | — | — |
| Young's Modulus MPa | 20 | 15 | 28 | 25 | 20 | 14 |
| Hardness - Shore A | 72 | 87 | 94 | 81 | 87 | 80 |
|         - Shore D | 24 | 31 | 43 | 39 | 41 | 31 |
| Tensile set % | — | — | 83 | 38 | 45 | 65 |

Notes:
Stabilizer-1 is a substituted phosphite sold under the name Polygard; Stabilizer-2 is a hindered phenol sold under the name Irganox 1035; Processing aid-1 is an acrylic polymer sold under the name Acryloid K-120N; and Processing aid-2 is a low molecular weight polyethylene sold under the name AC 629A.

EXAMPLE 2

Using a procedure essentially as described in Example 1, the compositions shown in Table II were prepared and evaluated. Experiment #11 is a control and Experiment #12 illustrates the need for zinc oxide to provide strength properties.

TABLE II

|  | EXPERIMENT # | |
|---|---|---|
|  | 11 | 12 |
| Nylon 11 | 35 | 35 |
| Carboxylated nitrile polymer | 65 | 65 |
| Magnesium chloride | 3.5 | 3.5 |
| Silica | 5 | 5 |
| Stabilizer-1 | 0.25 | 0.25 |
| Stabilizer-2 | 0.75 | 0.75 |
| Processing aid-1 | 0.5 | 0.5 |
| Processing aid-2 | 2 | 2 |
| Zinc oxide | — | 5 |
| Properties | | |
| Tensile strength MPa | 8.3 | 34 |
| Elongation % | 320 | 420 |
| 100% Modulus MPa | 5.9 | 11.6 |
| 300% Modulus MPa | 8.2 | 20.8 |
| Tensile set % | 64 | 69 |
| Young's Modulus MPa | 33 | 31 |

NOTE:
Stabilizer-1 is a hindered phenol; Stabilizer-2 is a substituted phosphite; Processing aid-1 is an acrylic polymer; Processing aid-2 is low molecular weight polyethylene.

EXAMPLE 3

Using essentially the procedure described in Example 1, the compositions shown in Table III were prepared and tested. The improved strength properties when both lithium chloride and zinc oxide were present are readily apparent. Permeability to Freon, using Freon 12 at a test temperature of 65° C. and determining the amount of Freon which permeates through a thin sheet of the compositions for a standard period of time, is reduced when both lithium chloride and zinc oxide are present.

Experiments #21, 22 and 23 are controls and Experiment #28, also a control, shows the properties for the pure nylon.

TABLE III

|  | EXPERIMENT # | | | | | | | |
|---|---|---|---|---|---|---|---|---|
|  | 21 | 22 | 23 | 24 | 25 | 26 | 27 | 28 |
| Nylon 11 | 60 | 60 | 60 | 60 | 60 | 60 | 60 | 100 |
| Carboxylated nitrile polymer | 40 | 40 | 40 | 40 | 40 | 40 | 40 | — |
| Lithium chloride | — | 4.8 | — | 4.8 | 4.8 | 4.8 | 4.8 | — |
| Zinc oxide | — | — | 5 | 5 | 3 | 2 | 1 | — |
| Stabilizer-1 | 0.75 | 0.75 | 0.75 | 0.75 | 0.75 | 0.75 | 0.75 | — |
| Stabilizer-2 | 0.25 | 0.25 | 0.25 | 0.25 | 0.25 | 0.25 | 0.25 | — |
| Processing aid-1 | 0.5 | 0.5 | 0.5 | 0.5 | 0.5 | 0.5 | 0.5 | — |
| Processing aid-2 | 2 | 2 | 2 | 2 | 2 | 2 | 2 | — |
| Silica | 5 | 5 | 5 | 5 | 5 | 5 | 5 | — |
| Properties | | | | | | | | |
| Tensile strength MPa | 11.8 | 13.2 | 24.1 | 32 | 35.3 | 28.8 | 25.8 | 36.5 |
| Elongation % | 130 | 140 | 360 | 320 | 310 | 290 | 280 | 20 |
| 100% Modulus MPa | 11.5 | 12.8 | 16.1 | 16.2 | 17.2 | 17.7 | 16.2 | — |
| 300% Modulus MPa | — | — | 20.6 | 28.4 | 32.4 | — | — | — |
| Tensile set % | 47 | 71 | 201 | 143 | 148 | 138 | 155 | 13 |
| Young's Modulus MPa | 78 | 92 | 96 | 92 | 102 | 99 | 90 | 176 |
| Permeability to Freon cm$^2$/sec/atmos $\times$ 10$^8$ | 1.6 | TL | 0.96 | TL | TL | — | — | TL |

Notes:
Stabilizer-1 is a hindered phenol; Stabilizer-2 is a substituted phosphite; Processing aid-1 is an acrylic polymer; Processing aid-2 is a low molecular weight polyethylene. TL means too low to measure.

EXAMPLE 4

Using the procedure described in Example 1, the composition shown in Table IV was prepared and tested. Instead of using zinc oxide as the second additive, zinc peroxide was used. The zinc peroxide was used as an approximately 50:50 (by weight) masterbatch of nitrile polymer and zinc peroxide known as PA-50. Good strength properties are shown for the composition.

EXAMPLE 5

This Example illustrates the use of alternative second additives. The compositions shown in Table V were prepared and tested. An internal mixer operated at 220° C. and 50 rpm was used, the nylon and lithium chloride being added first and mixed for about 2 to 3 minutes, the remaining ingredients except for the carboxylated nitrile polymer and Stabilizer-1 being added next and mixed for 1 to 2 minutes and the carboxylated nitrile polymer and Stabilizer-1 being added last with the mixing being continued for about 5 to 7 minutes to produce essentially uniform mixtures. The properties of the compositions are shown including the melt flow index I(MF1) which was measured in accordance with ASTM D1238, Condition L.

EXAMPLE 6

This Example illustrates the use of alternative first additives. Following the procedure described in Example 5, the compositions shown in Table VI were prepared and tested.

TABLE IV

| | |
|---|---|
| Nylon 11 | 35 |
| Carboxylated nitrile polymer | 60 |
| Lithium chloride | 2.8 |
| Stabilizer-1 | 0.75 |
| Stabilizer-2 | 0.25 |
| Processing aid-1 | 0.5 |
| Processing aid-2 | 2 |
| Silica | 5 |
| PA-50 | 10 |
| Properties | |
| Tensile strength MPa | 20.4 |
| Elongation % | 240 |
| 100% Modulus MPa | 11.3 |
| Young's Modulus MPa | 23 |
| Hardness Shore D | 46 |

TABLE V

| | EXPERIMENT # | | | | |
|---|---|---|---|---|---|
| | 31 | 32 | 33 | 34 | 35 |
| Nylon 11 | 60 | 60 | 60 | 60 | 60 |
| Carboxylated nitrile polymer | 40 | 40 | 40 | 40 | 40 |
| Lithium chloride | 1 | 1 | 1 | 1 | 1 |
| Stabilizer-1 | 0.75 | 0.75 | 0.75 | 0.75 | 0.75 |
| Stabilizer-2 | 0.25 | 0.25 | 0.25 | 0.25 | 0.25 |
| Processing aid-1 | 0.5 | 0.5 | 0.5 | 0.5 | 0.5 |
| Processing aid-2 | 2 | 2 | 2 | 2 | 2 |
| Silica | 5 | 5 | 5 | 5 | 5 |
| Zinc oxide | 3 | — | — | — | — |
| Magnesium oxide | — | 1.5 | — | — | — |
| Magnesium hydroxide | — | — | 2.15 | — | — |
| Calcium oxide | — | — | — | 2.1 | — |
| Calcium hydroxide | — | — | — | — | 2.7 |
| Properties | | | | | |
| Tensile strength MPa | 24.5 | 23 | 24 | 24.5 | 27 |
| Elongation % | 320 | 320 | 340 | 310 | 300 |
| 100% Modulus MPa | 15.7 | 13.7 | 12.8 | 12.8 | 14.2 |
| 300% Modulus MPa | 22.2 | 21.1 | 20.6 | 23.1 | — |
| Tensile set % | 190 | 145 | 175 | 175 | 138 |
| MFI g/10 min. | 0.7 | 0.41 | 0.53 | 0.75 | 0.08 |

TABLE VI

| | EXPERIMENT # | | |
|---|---|---|---|
| | 41 | 42 | 43 |
| Nylon 11 | 60 | 60 | 60 |
| Carboxylated nitrile polymer | 40 | 40 | 40 |
| Zinc chloride | 1 | — | — |
| Magnesium chloride | — | 1 | — |
| Calcium chloride | — | — | 1 |
| Stabilizer-1 | 0.75 | 0.75 | 0.75 |
| Stabilizer-2 | 0.25 | 0.25 | 0.25 |
| Processing aid-1 | 0.5 | 0.5 | 0.5 |
| Processing aid-2 | 2 | 2 | 2 |
| Silica | 5 | 5 | 5 |
| Zinc oxide | 5 | 5 | 5 |
| Properties | | | |
| Tensile strength MPa | 25.5 | 23.2 | 24.4 |
| Elongation % | 330 | 340 | 320 |
| 100% Modulus MPa | 14.1 | 14.2 | 16.4 |
| 300% Modulus MPa | 21.1 | 21.1 | 22.3 |
| Tensile set % | 210 | 203 | 175 |
| MFl g/10 min. | 0.47 | 0.83 | 0.51 |

What is claimed is:

1. A thermoplastic composition comprising, per 100 parts by weight of polymeric materials, as one polymeric material from about 30 to about 80 parts by weight of crystalline polyamide and as second polymeric material from about 20 to about 70 parts by weight of synthetic rubbery polymer which polymer comprises, for a total of 100 parts by weight, from about 25 to about 40 parts by weight of acrylonitrile or methacrylonitrile, from about 0.5 to about 10 parts by weight of one or more $\alpha,\beta$-unsaturated carboxylic acid and the balance butadiene, and as non-polymeric additives from about 0.1 to about 15 parts by weight per 100 parts by weight of polyamide of an additive selected from the halides of lithium, magnesium, calcium and zinc, and from about 1 to about 10 parts by weight per 100 parts by weight of polymeric materials of an additive selected from the oxides and hydroxides of magnesium, calcium, barium and zinc and the peroxides of calcium and zinc.

2. The composition of claim 1 which comprises as polymeric materials from about 35 to about 70 parts by weight of crystalline polyamide and from about 30 to about 65 parts by weight of synthetic rubbery polymer.

3. The composition of claim 2 which comprises as polymeric materials from about 35 to about 50 parts by weight of crystalline polyamide and from about 50 to about 65 parts by weight of synthetic rubbery polymer.

4. The composition of claim 2 which comprises as polymeric materials from about 55 to about 70 parts by weight of crystalline polyamide and from about 30 to about 45 parts by weight of synthetic rubbery polymer.

5. The composition of claim 2 in which the synthetic rubbery polymer contains from about 25 to about 40 parts by weight of acrylonitrile.

6. The composition of claim 5 wherein the $\alpha,\beta$-unsaturated carboxylic acid of the synthetic rubbery polymer is selected from acrylic, methacrylic, fumaric, maleic and itaconic acid.

7. The composition of claim 2 wherein the halide additive is selected from the chlorides and bromides of lithium, magnesium, calcium and zinc.

8. The composition of claim 7 in which the amount of said halide additive is from about 1 to about 12 parts by weight per 100 parts by weight of polyamide.

9. The composition of claim 7 in which said halide additive is lithium chloride present in an amount of from about 2 to about 10 parts by weight per 100 parts by weight of polyamide.

10. The composition of claim 2 wherein the second additive is selected from zinc oxide, zinc hydroxide, zinc peroxide, magnesium oxide, magnesium hydroxide, calcium oxide and calcium hydroxide.

11. The composition of claim 10 in which the amount of said second additive is from about 1 to about 8 parts by weight per 100 parts by weight of polyamide plus synthetic polymer.

12. The composition of claim 10 in which said second additive is zinc oxide present in an amount of from about 2 to about 6 parts by weight per 100 parts by weight of polyamide plus synthetic polymer.

13. The composition of claim 2 in which the synthetic rubbery polymer contains from about 25 to about 40 parts by weight of acrylonitrile and α,β-unsaturated carboxylic acid is selected from acrylic, methacrylic, fumaric, maleic and itaconic acids, the halide additive is selected from the chlorides and bromides of lithium, magnesium, calcium and zinc and is present in an amount of from about 1 to about 12 parts by weight per 100 parts by weight of polyamide, and the second additive is selected from zinc oxide, zinc hydroxide, zinc peroxide, magnesium oxide, magnesium hydroxide, calcium oxide and calcium hydroxide present in an amount of from about 1 to about 8 parts by weight per 100 parts by weight of polyamide plus synthetic polymer.

14. The composition of claim 13 wherein said halide additive is lithium chloride present in an amount of from about 2 to about 10 parts by weight per 100 parts by weight of polyamide and said second additive is zinc oxide present in an amount of from about 2 to about 6 parts by weight per 100 parts by weight of polyamide plus synthetic polymer.

15. The composition of claim 1 which also contains any one or more of fillers, processing aids and antioxidants or stabilizers.

16. The composition of claim 2 which also contains any one or more of fillers, processing aids and antioxidants or stabilizers.

17. The composition of claim 16 wherein the fillers are selected from carbon black, silica, calcium silicate, clay, calcium carbonate and mixtures thereof present in amounts of from about 2 to about 20 parts by weight per 100 parts by weight of polyamide plus synthetic polymer.

18. A process for producing a thermoplastic polymeric composition comprising mixing from about 30 to about 80 parts by weight of a crystalline polyamide and from about 0.1 to about 15 parts by weight per 100 parts by weight of polyamide of an additive selected from the halides of lithium, magnesium, calcium and zinc, from about 20 to about 70 parts by weight of a synthetic rubbery polymer, for a total of 100 parts by weight of polyamide and synthetic polymer, said synthetic polymer comprising, for a total of 100 parts by weight, from about 25 to about 40 parts by weight of acrylonitrile or methacrylonitrile, from about 0.5 to about 10 parts by weight of one or more α,β-unsaturated carboxylic acid and the balance butadiene, and an additive selected from the oxides and hydroxides of magnesium, calcium, barium and zinc and the peroxides of calcium and zinc in an amount of from about 1 to about 10 parts by weight per 100 parts by weight of polyamide and synthetic polymer, said mixing being at a temperature of from about 180° C. to the melting point of the polyamide for a time long enough to yield an essentially uniform thermoplastic polymeric composition.

19. The process of claim 18 in which the crystalline polyamide is present in an amount of from about 35 to about 70 parts by weight and the synthetic polymer is present in an amount of from about 30 to about 65 parts by weight.

20. The process of claim 19 wherein the synthetic polymer contains from about 25 to about 40 parts by weight of acrylonitrile.

21. The process of claim 19 wherein the mixing is at a temperature of from about 180° to about 230° C.

22. The process of claim 19 in which the mixing is undertaken in essentially one stage.

23. The process of claim 19 in which the mixing is undertaken in two or more stages with the polyamide and the halide additive being at least partially mixed first and the remaining components being added thereto or separately in a second mixing operation.

* * * * *